(12) United States Patent
Komatsu et al.

(10) Patent No.: US 9,771,475 B2
(45) Date of Patent: *Sep. 26, 2017

(54) LIQUID CRYSTAL POLYESTER COMPOSITION, METHOD FOR PRODUCING LIQUID CRYSTAL POLYESTER COMPOSITION, AND MOLDED ARTICLE

(71) Applicant: Sumitomo Chemical Company, Limited, Tokyo (JP)

(72) Inventors: Shintaro Komatsu, Ibaraki (JP); Hiroshi Harada, Singapore (SG)

(73) Assignee: Sumitomo Chemical Company, Limited, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 14/386,570

(22) PCT Filed: Mar. 18, 2013

(86) PCT No.: PCT/JP2013/058468
§ 371 (c)(1),
(2) Date: Sep. 19, 2014

(87) PCT Pub. No.: WO2013/141396
PCT Pub. Date: Sep. 26, 2013

(65) Prior Publication Data
US 2015/0073068 A1    Mar. 12, 2015

(30) Foreign Application Priority Data
Mar. 21, 2012 (JP) .................................. 2012-063666

(51) Int. Cl.
*C08L 67/04* (2006.01)
*B29B 7/48* (2006.01)
(Continued)

(52) U.S. Cl.
CPC .............. *C08L 67/04* (2013.01); *B29B 7/482* (2013.01); *B29B 7/726* (2013.01); *B29B 7/845* (2013.01);
(Continued)

(58) Field of Classification Search
CPC ....................................................... C08K 3/34
See application file for complete search history.

(56) References Cited

U.S. PATENT DOCUMENTS 5,976,406 A    11/1999  Nagano et al.
8,231,805 B2    7/2012  Fukuhara et al.
(Continued)

FOREIGN PATENT DOCUMENTS

CN    101506311 A    8/2009
CN    102061068 A    5/2011
(Continued)

OTHER PUBLICATIONS

Int'l Search Report issued Jun. 25, 2013 in Int'l Application No. PCT/JP2013/058468.
(Continued)

*Primary Examiner* — Chanceity Robinson
(74) *Attorney, Agent, or Firm* — Panitch Schwarze Belisario & Nadel LLP

(57) ABSTRACT

A liquid crystal polyester composition contains: a liquid crystal polyester in an amount of 100 parts by mass as well as a fibrous filler and a plate-like filler in an amount of not less than 65 parts by mass and not more than 100 parts by mass in total. The fibrous filler in the composition has a number average fiber diameter of not less than 5 μm and not more than 15 μm and a number average fiber length of more than 200 μm and less than 400 μm. The mass ratio of the fibrous filler to the plate-like filler in the composition is not less than 3 and not more than 15. The flow starting tem-
(Continued)

perature of the composition is not lower than 250° C. and lower than 314° C.

11 Claims, 1 Drawing Sheet

(51) Int. Cl.
| | |
|---|---|
| B29B 7/72 | (2006.01) |
| B29B 7/84 | (2006.01) |
| B29B 7/90 | (2006.01) |
| C08K 3/34 | (2006.01) |
| C08K 7/14 | (2006.01) |
| B29C 47/40 | (2006.01) |
| B29C 47/92 | (2006.01) |
| B29C 47/38 | (2006.01) |
| B29C 47/60 | (2006.01) |
| C08K 7/08 | (2006.01) |
| C08K 7/10 | (2006.01) |
| C09K 19/38 | (2006.01) |
| B29C 45/00 | (2006.01) |
| B29C 47/10 | (2006.01) |
| B29C 47/82 | (2006.01) |
| C09K 19/52 | (2006.01) |
| B29K 67/00 | (2006.01) |
| B29L 31/34 | (2006.01) |

(52) U.S. Cl.
CPC .......... *B29B 7/90* (2013.01); *B29C 45/0001* (2013.01); *B29C 47/38* (2013.01); *B29C 47/40* (2013.01); *B29C 47/6031* (2013.01); *B29C 47/6062* (2013.01); *B29C 47/92* (2013.01); *C08K 3/34* (2013.01); *C08K 7/08* (2013.01); *C08K 7/10* (2013.01); *C08K 7/14* (2013.01); *C09K 19/3809* (2013.01); *B29C 47/1045* (2013.01); *B29C 47/1081* (2013.01); *B29C 47/822* (2013.01); *B29C 47/825* (2013.01); *B29C 2947/92704* (2013.01); *B29K 2067/00* (2013.01); *B29L 2031/3493* (2013.01); *C08K 2201/003* (2013.01); *C08K 2201/004* (2013.01); *C08K 2201/016* (2013.01); *C09K 2019/521* (2013.01)

(56) References Cited

U.S. PATENT DOCUMENTS

| | | | |
|---|---|---|---|
| 2002/0017631 | A1 | 2/2002 | Maeda et al. |
| 2003/0001139 | A1 | 1/2003 | Nagano et al. |
| 2009/0197471 | A1* | 8/2009 | Fukatsu ............... C08K 3/0033 439/630 |
| 2011/0086968 | A1 | 4/2011 | Fukatsu et al. |
| 2011/0114884 | A1* | 5/2011 | Fukuhara ............ C08K 3/0033 252/299.6 |
| 2012/0104315 | A1 | 5/2012 | Fukuhara et al. |
| 2012/0217678 | A1* | 8/2012 | Komatsu .............. C08G 63/605 264/328.1 |
| 2012/0235090 | A1 | 9/2012 | Maeda et al. |
| 2013/0082206 | A1* | 4/2013 | Fukuhara ........... C09K 19/3809 252/299.5 |

FOREIGN PATENT DOCUMENTS

| | | |
|---|---|---|
| JP | H06-172619 A | 6/1994 |
| JP | 2001288342 A | 10/2001 |
| JP | 2003-109700 A | 4/2003 |
| JP | 2007-254716 A | 10/2007 |
| JP | 2010138228 A | 6/2010 |
| JP | 2011038029 A | 2/2011 |
| JP | 2011-074301 A | 4/2011 |
| JP | 2011-122148 A | 6/2011 |
| JP | 2012-206296 A | 10/2012 |
| JP | 5385609 B2 | 1/2014 |

OTHER PUBLICATIONS

Office Action issued Oct. 10, 2015 in CN Application No. 201380015236.6.
Office Action issued Apr. 24, 2015 in CN Application No. 2013800152366.

\* cited by examiner

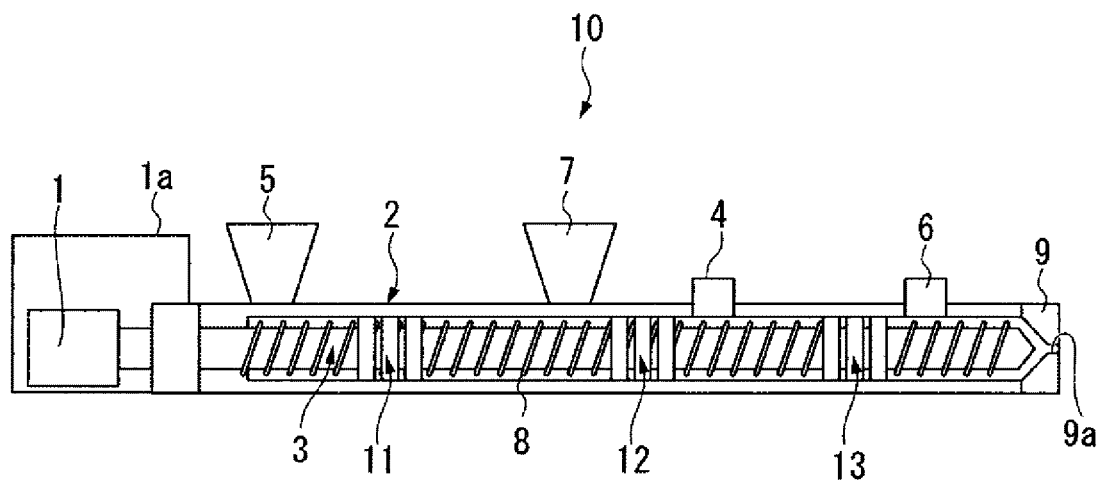

LIQUID CRYSTAL POLYESTER COMPOSITION, METHOD FOR PRODUCING LIQUID CRYSTAL POLYESTER COMPOSITION, AND MOLDED ARTICLE

CROSS-REFERENCE TO RELATED APPLICATION

This application is a Section 371 of International Application No. PCT/JP2013/058468, filed Mar. 18, 2013, which was published in the Japanese language on Sep. 26, 2013, under International Publication No. WO 2013/141396 A1, and the disclosure of which is incorporated herein by reference.

TECHNICAL FIELD

The present invention relates to a liquid crystal polyester composition, a method for producing a liquid crystal polyester composition, and a molded article.

The present application claims the priority based on Japanese Patent Application No. 2012-063666 filed in Japan on Mar. 21, 2012, the disclosure of which is hereby incorporated.

BACKGROUND ART

Liquid crystal polyester compositions including a liquid crystal polyester, a fibrous filler and a plate-like filler have been previously known.

For example, Patent Document 1 discloses a liquid crystal polyester composition obtained by providing a liquid crystal polyester composition including a liquid crystal polyester (A) having a flow temperature of 310° C. to 400° C. and a liquid crystal polyester (B) having a flow temperature of 270° C. to 370° C., the liquid crystal polyester (B) blended in an amount of 10 to 150 parts by mass based on 100 parts by mass of the liquid crystal polyester (A), and blending with the liquid crystal polyester composition a fibrous and/or flat inorganic filler in an amount of 15 to 180 parts by mass based on the 100 parts by mass of the total of the liquid crystal polyester (A) and the liquid crystal polyester (B).

Patent Document 2 discloses a liquid-crystalline resin composition including: 100 parts by mass of a liquid-crystalline resin; a fibrous filler; and a scalelike filler having a number average molecular weight of 8 μm or more, wherein the blending amount of the fibrous filler is larger than the blending amount of the scalelike filler, and the total amount of the fibrous filler and the plate-like filler is 70 to 150 parts by mass.

Patent Document 3 discloses a liquid crystal polyester composition including: a liquid crystal polyester; 10 to 20% by mass of a fibrous filler having an average fiber diameter of 5 to 30 μm and a weight average fiber length of 250 to 350 μm; and 30 to 40% by mass of a plate-like filler, wherein the total amount of the fibrous filler and the plate-like filler is 40 to 60% by mass based on the whole composition.

Patent Document 4 discloses a composition including: a liquid crystal polyester; 10 to 25% by mass of a fibrous filler having a weight average fiber length of 250 to 600 μm; and 25 to 30% by mass of a plate-like filler, wherein the total amount of the fibrous filler and the plate-like filler is 40 to 50% by mass based on the whole composition.

Patent Document 1: JP-A-10-219085
Patent Document 2: JP-A-2007-254716
Patent Document 3: WO 2008/023839
Patent Document 4: JP-A-2010-003661

DISCLOSURE OF THE INVENTION

Generally, a resin composition is required to ensure that molding defects of a molded article obtained by using the resin composition are suppressed. "Flash" and "short shots" are taken as excepted molding defects. The "flash" is a defective phenomenon occurring when a resin leaking from the mating surface (parting line) of a mold is solidified, and the "short shot" is a general term of insufficient filling of a resin material during molding and defective phenomena associated therewith (see "Plastics Handbook 19th edition" edited by Osaka Municipal technical Research institute, Plastics Handbook Editing Committee and Plastic Technology Association, PLASTICS AGE CO., LTD., May 20, 2002, page 255).

Flash occurs mainly due to excessive fluidity of a molten resin composition with respect to a mold used, and short shots occur mainly due to insufficient fluidity of a molten resin composition. Therefore, when fluidity of a resin composition in melting (hereinafter, may be referred to as "melt fluidity") is varied, the frequencies of occurrence of flash and short shots vary simultaneously. For example, as fluidity of a resin composition in melting is improved, short shots can be suppressed during injection molding while flash easily occurs due to the resin composition easily leaked from a mold.

In the descriptions below, a relationship between the rates of occurrence, i.e., frequencies of occurrence, of flash and short shots in a resin composition is sometimes referred to as a "flow balance" of the resin composition. The good "flow balance" means that the resin composition has melt fluidity which ensures that occurrence of flash and occurrence of short shots are suppressed with good balance (suppressed simultaneously). The bad "flow balance" means that at least one of the flash and the short shot fails to be suppressed, and the resin composition has melt fluidity that causes a molding defect.

The resin composition is required not only to have a good flow balance but also to retain or improve the strength of the obtained molded article. However, when various fillers are added to the resin composition for improving the strength of the molded article, fluidity of the resin composition may be reduced due to influences of the filler, leading to deterioration of the flow balance. For example, the strength of the molded article can be improved by adding various fillers to the resin composition, but fluidity of the resin composition in melting is reduced due to influences of the filler, so that short shots easily occur.

Particularly, the liquid crystal polyesters used in Patent Documents 1 to 4 are known to easily flow in melting, due to easy occurrence of flash, and to cause cracks to be easily generated at a welded section of the molded article obtained by injection molding because the molded article has anisotropy in strength due to orientation of the resin during molding. The liquid crystal polyester compositions described in Patent Documents 1 to 4 do not always sufficiently secure both suppression of generation of cracks in the molded article (hereinafter, may be referred to as "crack resistance") and achievement of a good balance in a melted state.

An object of the present invention is to provide a liquid crystal polyester composition that gives an excellent molded article by securing both crack resistance and a good flow balance. Further, an object of the present invention is to provide a method for producing such liquid crystal polyester composition, and a molded article molded using the liquid crystal polyester composition.

One embodiment of the present invention provides a liquid crystal polyester composition comprising: a liquid crystal polyester in an amount of 100 parts by mass, as well as a fibrous filler and a plate-like filler in an amount of not less than 65 parts by mass and not more than 100 parts by mass in total, where the fibrous filler has a number average fiber diameter of not less than 5 μm and not more than 15 μm and a number average fiber length of more than 200 μm and less than 400 μm, the mass ratio of the fibrous filler to the plate-like filler is not less than 3 and not more than 15, and the flow starting temperature is not lower than 250° C. and lower than 314° C.

In one embodiment of the present invention, the liquid crystal polyester preferably has a repeating unit represented by the following formula (1), a repeating unit represented by the following formula (2) and a repeating unit represented by the following formula (3).

 (1)

 (2)

 (3)

Here, $Ar^1$ represents a phenylene group, a naphthylene group or a biphenylene group, $Ar^2$ and $Ar^3$ each independently represent a phenylene group, a naphthylene group, a biphenylene group or a group represented by the following formula (4), X and Y each independently represent an oxygen atom or an imino group, the hydrogen atoms present in the group represented by $Ar^1$, $Ar^2$ or $Ar^3$ may each independently be replaced by a halogen atom, an alkyl group or an aryl group.

 (4)

Here, $Ar^4$ and $Ar^5$ each independently a phenylene group or a naphthylene group.

Z represents an oxygen atom, a sulfur atom, a carbonyl group, a sulfonyl group or an alkylidene group.

In one embodiment of the present invention, the liquid crystal polyester is preferably a mixture of a liquid crystal polyester (A) comprising a repeating unit represented by the formula (1), the repeating unit represented by the formula (2) and the repeating unit represented by the formula (3), where $Ar^1$ is a p-phenylene group; and a liquid crystal polyester (B) comprising the repeating unit represented by the formula (1), the repeating unit represented by the formula (2) and the repeating unit represented by the formula (3), where $Ar^1$ is a 2,6-naphthylene group.

In one embodiment of the present invention, the liquid crystal polyester composition preferably comprises the liquid crystal polyester (A) in an amount of 20 parts by mass or more based on 100 parts by mass of the liquid crystal polyester.

In one embodiment of the present invention, the fibrous filler is preferably at least one selected from the group consisting of a glass fiber, a wollastonite whisker, an aluminum borate whisker and a potassium titanate whisker.

In one embodiment of the present invention, the plate-like filler is preferably one or both of mica and talc.

In one embodiment of the present invention, the plate-like filler preferably has a volume average particle size of not less than 10 μm and not more than 30 μm.

Further, one embodiment of the present invention provides a method for producing a liquid crystal polyester composition, the method including a step of melting and kneading a liquid crystal polyester in an amount of 100 parts by mass as well as a mixture which contains a fibrous filler raw material and a plate-like filler in an amount of not less than 65 parts by mass and not more than 100 parts by mass in total, where the fibrous filler raw material has a number average fiber diameter of not less than 5 μm and not more than 15 μm and a number average aspect ratio of 100 or more, an extruder used in the melting and kneading step has a cylinder and a screw installed in the cylinder, the cylinder has a first supply port, and a second supply port set on the downstream side in the extrusion direction with respect to the first supply port, the screw has a ratio (L/D) of not less than 15 and not more than 65 where L is an effective length of the screw and D is a diameter of the screw, and for melting and kneading, the liquid crystal polyester in an amount of 50% by mass or more based on the total supply amount and the filler raw material in an amount of 50% by mass or less based on the total supply amount are supplied from the first supply port, and the residual amount of the liquid crystal polyester, the residual amount of the filler raw material and the total amount of the plate-like filler are supplied from the second supply port.

In this specification, the "filler raw material" refers to a fibrous substance which is ruptured during melting and kneading to thereby form a fibrous filler to be contained in the liquid crystal polyester composition.

Further, one embodiment of the present invention provides a molded article obtained by injection-molding the liquid crystal polyester composition or a liquid crystal polyester composition produced by the method for producing a liquid crystal polyester composition.

In one embodiment of the present invention, the molded article is preferably a connector.

In one embodiment of the present invention, the connector is preferably a CPU socket.

BRIEF DESCRIPTION OF DRAWINGS

FIG. 1 is a schematic sectional view showing an extruder that is used in a method for producing a liquid crystal polyester composition according to the embodiment.

DESCRIPTION OF REFERENCE SIGNS

1 . . . Motor, 1a . . . Motor box, 2 . . . Cylinder, 3 . . . Screw, 4 . . . First vent section, 5 . . . Main feed port (first supply port), 6 . . . Second vent section, 7 . . . Side feed port (second supply port), 8 . . . Conveyance section, 9 . . . Discharge die, 10 . . . Extruder, 11 . . . First kneading section, 12 . . . Second kneading section, 13 . . . Third kneading section

MODES FOR CARRYING OUT THE INVENTION

[Liquid Crystal Polyester Composition]

A liquid crystal polyester composition of this embodiment comprises a liquid crystal polyester in an amount of 100 parts by mass; and a fibrous filler and a plate-like filler in an amount of not less than 65 parts by mass and not more than 100 parts by mass in total, wherein the fibrous filler has a number average fiber diameter of not less than 5 μm and not more than 15 μm and a number average fiber length of more than 200 μm and less than 400 μm, the mass ratio of the fibrous filler to the plate-like filler (mass of fibrous filler/ mass of plate-like filler) is not less than 3 and not more than 15, and the flow starting temperature is not lower than 250° C. and lower than 314° C.

The liquid crystal polyester composition may be a mixture of a liquid crystal polyester, a fibrous filler and a plate-like filler together (mixing powders), or may be one processed in the form of a pellet by melting and kneading the components.

(Liquid Crystal Polyester)

The liquid crystal polyester according to this embodiment is preferably a liquid crystal polyester which shows liquid crystallinity in a molten state, and is melted at a temperature of 450° C. or lower. The liquid crystal polyester may be a liquid crystal polyester amide, or a liquid crystal polyester ether, or a liquid crystal polyester carbonate, or liquid crystal polyester imide. The liquid crystal polyester is preferably a fully aromatic liquid crystal polyester formed by using only an aromatic compound as a raw material monomer.

Typical examples of the liquid crystal polyester include those formed by polymerizing (performing polycondensation of) at least one compound selected from the group consisting of an aromatic diol, an aromatic hydroxyamine and an aromatic diamine and an aromatic dicarboxylic acid; those formed by polymerizing two or more kinds of aromatic hydroxycarboxylic acids; those formed by polymerizing at least one compound selected from the group consisting of an aromatic diol, an aromatic hydroxyamine and an aromatic diamine and an aromatic dicarboxylic acid; and those formed by polymerizing a polyester such as polyethylene terephthalate with an aromatic hydroxycarboxylic acid. One, some or all of the aromatic hydroxycarboxylic acids, the aromatic dicarboxylic acids, the aromatic dials, the aromatic hydroxyamines and the aromatic diamines may each independently be replaced by a polymerizable derivative of each of these compounds.

Examples of the polymerizable derivative of the compound having a carboxy group, such as an aromatic hydroxycarboxylic acid and an aromatic dicarboxylic acid may include those formed by converting a carboxy group into an alkoxycarbonyl group or an aryloxycarbonyl group (esters), those formed by converting a carboxy group into a haloformyl group (acid halides), and those formed by converting a carboxy group into an acyloxycarbonyl group (acid anhydrides). Examples of the polymerizable derivative of the compound having a hydroxy group, such as an aromatic hydroxycarboxylic acid, an aromatic diol and an aromatic hydroxyamine may include those formed by acylating a hydroxy group to be converted into an acyloxyl group (acylated products). Examples of the polymerizable derivative of the compound having an amino group, such as an aromatic hydroxyamine and an aromatic diamine may include those formed by acylating an amino group to be converted into an acylamino group (acylated products).

The liquid crystal polyester preferably has a repeating unit represented by the following formula (1) (hereinafter, which may be referred to as a "repeating unit (1)"), and more preferably has a repeating unit (1), a repeating unit represented by the following formula (2) (hereinafter, which may be referred to as a "repeating unit (2)") and a repeating unit represented by the following formula (3) (hereinafter, which may be referred to as a "repeating unit (3)").

   (1)

   (2)

   (3)

Here, $Ar^1$ represents a phenylene group, a naphthylene group or a biphenylene group, $Ar^2$ and $Ar^3$ each independently represent a phenylene group, a naphthylene group, a biphenylene group or a group represented by the following formula (4), X and Y each independently represent an oxygen atom or an imino amino (—NH—), the hydrogen atoms present in the group represented by $Ar^1$, $Ar^2$ or $Ar^3$ may each independently be replaced by a halogen atom, an alkyl group or an aryl group.

   (4)

Here, $Ar^4$ and $Ar^5$ each independently represent a phenylene group or a naphthylene group, and Z represents an oxygen atom, a sulfur atom, a carbonyl group, a sulfonyl group or an alkylidene group.

Examples of the halogen atom include a fluorine atom, a chlorine atom, a bromine atom and an iodide atom.

Examples of the alkyl group include a methyl group, an ethyl group, a n-propyl group, an isopropyl group, a n-butyl group, an isobutyl group, a s-butyl group, a t-butyl group, a n-hexyl group, a 2-ethylhexyl group, a n-octyl group and a n-decyl group. The carbon number of the alkyl group is preferably 1 to 10.

Examples of the aryl group include a phenyl group, an o-tolyl group, a m-tolyl group, a p-tolyl group, a 1-naphthyl group and a 2-naphthyl group. The carbon number of the aryl group is preferably 6 to 20.

When the hydrogen atoms present in the above-mentioned group represented by $Ar^1$, $Ar^2$ or $Ar^3$ are replaced by these groups (i.e. halogen atom, alkyl group and/or aryl group), the number of groups replacing the hydrogen atoms is preferably 2 or less, more preferably 1 independently for each of the groups represented by $Ar^1$, $Ar^2$ and $Ar^3$.

Examples of the alkylidene group include a methylene group, an ethylidene group, an isopropylidene group, a n-butylidene group and a 2-ethylhexylidene group. The carbon number of the alkylidene group is preferably 1 to 10.

The repeating unit (1) is a repeating unit derived from a predetermined aromatic hydroxycarboxylic acid. The repeating unit (1) is preferably a repeating unit derived from p-hydroxybenzoic acid ($Ar^1$ is a p-phenylene group), or a repeating unit derived from 6-hydroxy-2-naphthoic acid ($Ar^1$ is a 2,6-naphthylene group).

The repeating unit (2) is a repeating unit derived from a predetermined aromatic dicarboxylic acid. The repeating unit (2) is preferably one having a p-phenylene group as $Ar^2$ (repeating unit derived from terephthalic acid), one having a m-phenylene group as $Ar^2$ (repeating unit derived from isophthalic acid), or one having a 2,6-naphthylene group as $Ar^2$ (repeating unit derived from 2,6-naphthalenedicarboxylic acid).

The repeating unit (3) is a repeating unit derived from a predetermined aromatic diol, aromatic hydroxyamine or aromatic diamine. The repeating unit (3) is preferably one having a p-phenylene group as $Ar^3$ (repeating unit derived from hydroquinone, p-aminophenol or p-phenylenediamine), or one having a 4,4'-biphenylene group as $Ar^3$ (repeating unit derived from a 4,4'-dihydroxybiphenyl, 4-amino-4'-hydroxybiphenyl or 4,4'-diaminobiphenyl).

The content of the repeating unit (1) is preferably 30 mol % or more, more preferably not less than 30 mol % and not more than 80 mol %, further preferably not less than 40 mol % and not more than 70 mol %, still further preferably not less than 45 mol % and not more than 65 mol % where the total amount of all repeating units forming the liquid crustal polyester (a value obtained by determining a substance amount equivalent amount of each repeating unit and summing these substance amount equivalent amounts where each substance amount equivalent amount is obtained by dividing a mass of each repeating unit, which forms the liquid crystal polyester, by a formula weight of each repeating unit) is 100 mol %.

The content of the repeating unit (2) is preferably 35 mol % or less, more preferably not less than 10 mol % and not more than 35 mol %, further preferably not less than 15 mol % and not more than 30 mol %, still further preferably not less than 17.5 mol % and not more than 27.5 mol % where the total amount of all repeating units forming the liquid crustal polyester is 100 mol %.

The content of the repeating unit (3) is preferably 35 mol % or less, more preferably not less than 10 mol % and not more than 35 mol %, further preferably not less than 15 mol % and not more than 30 mol %, still further preferably not less than 17.5 mol % and not more than 27.5 mol % where the total amount of all repeating units forming the liquid crustal polyester is 100 mol %.

The melt fluidity, heat resistance and strength/stiffness of the liquid crystal polyester tend to be improved as the content of the repeating unit (1) increases. However, when the content of the repeating unit (1) is more than 80 mol %, the melt temperature and the melt viscosity tend to increase, so that a temperature required for molding tends to increase.

The ratio of the contents of the repeating unit (2) and the content of the repeating unit (3) is preferably 0.9/1 to 1/0.9, more preferably 0.95/1 to 1/0.95, further preferably 0.98/1 to 1/0.98 in terms of [content of repeating unit (2)]/[content of repeating unit (3)] (mol/mol).

The liquid crystal polyester may have two or more of repeating units (1) to (3) in each occurrence. The liquid crystal polyester may have a repeating unit other than repeating units (1) to (3), and the content thereof is preferably not less than 0 mol % and not more than 10 mol %, more preferably not less than 0 mol % and not more than 5 mol % where the total amount of all repeating units is 100 mold.

For reducing the melt viscosity of the liquid crystal polyester, each of X and Y of the repeating unit (3) is preferably an oxygen atom (i.e. repeating unit derived from an aromatic diol). When the amount of the repeating unit (3) in which each of X and Y is an oxygen atom is increased, the melt viscosity of the liquid crystal polyester decreases, and therefore the amount of the repeating unit (3) in which each of X and Y is an oxygen atom can be controlled as necessary to adjust the melt viscosity of the liquid crystal polyester.

Preferably, the liquid crystal polyester is produced by melt-polymerizing a raw material monomer corresponding to a repeating unit that forms the liquid crystal polyester, and subjecting the obtained polymerized product (prepolymer) to solid phase polymerization. A high-molecular-weight liquid crystal polyester having high heat resistance and strength/stiffness can be hereby produced with good operability, and therefore melt polymerization may be performed under a catalyst. Examples of the catalyst include metal compounds such as magnesium acetate, stannous acetate, tetrabutyl titanate, lead acetate, sodium acetate, potassium acetate and antimony trioxide, and nitrogen-containing heterocyclic compounds such as 4-(dimethylamino)pyridine and 1-methylimidazole, and among them, nitrogen-containing heterocyclic compounds are preferred.

The flow starting temperature of the liquid crystal polyester is appropriately adjusted according to a flow starting temperature of the liquid crystal polyester composition described later. The flow starting temperature of the liquid crystal polyester composition strongly depends on the flow starting temperature of a resin component (liquid crystal polyester) as a base. Therefore, the flow starting temperature of the liquid crystal polyester is controlled so that the flow starting temperature of the liquid crystal polyester composition falls within a temperature range of not lower than 250° C. and lower than 314° C. Details will be described later.

The flow starting temperature, which is also called a flow temperature or flowing temperature, is a temperature that indicates a molecular weight of the liquid crystal polyester (see "Liquid Crystal Polymer-Synthesis/Molding/Application-" edited by Naoyuki KOIDE, CMC Publishing Co., Ltd., Jun. 5, 1987, page 95). Using a flow tester ("Model CET-500" manufactured by Shimadzu Corporation), a flow starting temperature can be measured by a method in which about 2 g of a liquid crystal polyester is filled in a cylinder provided with a die including a nozzle having an inner diameter of 1 mm and a length of 10 mm, the liquid crystal polyester is melted by elevating the temperature at a rate of 4° C./minute under a load of 9.8 MPa (100 kgf/cm$^2$), and extruded from the nozzle, and a temperature when its viscosity is determined as 4800 Pa·s (48000 poises) (flow starting temperature) is measured.

(Fibrous Filler)

The fibrous filler contained in the liquid crystal polyester composition of this embodiment has a number average fiber diameter of not less than 5 μm and not more than 15 μm and a number average fiber length of more than 200 μm and less than 400 μm.

The number average fiber length is preferably more than 200 μm and not more than 350 μm, more preferably more than 200 μm and not more than 300 μm. When the number average fiber length of the fibrous filler in the liquid crystal polyester composition falls within the above-mentioned range, crack resistance of the obtained molded article formed of the liquid crystal polyester composition can be improved to suppress flash and short shots.

The number average fiber diameter and the number average fiber length can be measured by observation with an electron microscope. A specific method will be described below.

First, 1.0 g of a resin composition is taken in a crucible, and treated in an electric furnace at 600° C. for 4 hours and thereby incinerated to obtain a residue containing a fibrous filler. The residue is dispersed in methanol, and spread over a slide glass, and in this state, a microscope photograph is taken. Next, in a projection image of the fibrous filler from a field view direction, which is obtained from the microscope photograph, a length in a longitudinal direction is read as a fiber length, a length in a direction orthogonal to the longitudinal direction is read as a fiber diameter, and an arithmetic mean value is calculated to determine a number average fiber diameter and a number average fiber length. For calculation of the mean value, the population parameter is set to 400 or more.

As the fibrous filler, one or both of a fibrous inorganic filler and a fibrous organic filler can be used. Examples of the fibrous inorganic filler may include glass fibers; carbon fibers such as PAN-based carbon fibers and pitch-based carbon fibers; ceramic fibers such as silica fibers, alumina fibers and silica alumina fibers; metal fibers such as stainless fibers; and whiskers such as potassium titanate whiskers, barium titanate whiskers, wollastonite whiskers, aluminum borate whiskers, silicon nitride whiskers and silicon carbide whiskers. Among them, at least one fibrous filler selected from the group consisting of a glass fiber, a potassium titanate whisker, a wollastonite whisker and an aluminum borate whisker is preferred, with the glass fiber being more preferred.

(Plate-Like Filler)

The plate-like Filler contained in the liquid crystal polyester composition of this embodiment is preferably an inorganic filler. As the flat inorganic filler, at least one plate-like filler selected from the group consisting of talc, mica, graphite, wollastonite, glass flake, barium sulfate and potassium carbonate may be shown as an example. Among them, one or both of talc and mica is preferred, with talc being more preferred.

The volume average particle size of the plate-like filler contained in the liquid crystal polyester composition of this embodiment is preferably not less than 10 μm and not more than 30 μm, more preferably not less than 10 μm and not more than 20 μm because the crack resistance of a molded product formed of the liquid crystal polyester composition is improved.

The volume average particle size of the plate-like filler can be measured by observation with an electron microscope. A specific method will be described below.

First, 1.0 g of a resin composition is taken in a crucible, and treated in an electric furnace at 600° C. for 4 hours and thereby incinerated to obtain a residue containing a plate-like filler. The residue is dispersed in methanol, and spread over a slide glass, and in this state, a microscope photograph is taken. Next, an area is determined for a projection image of the plate-like filler from a field view direction, which is obtained from the microscope photograph, and when a circle having an area equal to the projection image is assumed, a diameter of the circle (area circle equivalent diameter) is read as a particle size of the plate-like filler, and an arithmetic mean value is calculated to determine a volume average particle size. For calculation of the mean value, the population parameter is set to 400 or more.

Since the volume average particle size of the plate-like filler is not substantially changed by melting and kneading described later, the volume average particle size of the plate-like filler can also be determined by measuring the volume average particle size of the plate-like filler before it is included in the liquid crystal polyester composition.

(Liquid Crystal Polyester Composition)

The liquid crystal polyester composition of this embodiment comprises the liquid crystal polyester in an amount of 100 parts by mass, as well as the fibrous filler and the plate-like filler in an amount of not less than 65 parts by mass and not more than 100 parts by mass in total. The blending amount of the total of the fibrous filler and the plate-like filler is preferably not less than 65 parts by mass and not more than 90 parts by mass, more preferably not less than 70 parts by mass and not more than 90 parts by mass based on 100 parts by mass of the liquid crystal polyester.

When the blending amount of the total of the fibrous filler and the plate-like filler is 65 parts by mass or more, the effect of improving crack resistance and reducing warpage of a molded article formed of the liquid crystal polyester composition is significant. When the blending amount of the total of the fibrous filler and the plate-like filler is 100 parts by mass or less, the liquid crystal polyester composition has sufficient melt fluidity.

In the liquid crystal polyester composition, the mass ratio of the fibrous filler to the plate-like filler is not less than 3 and not more than 15. The mass ratio of the fibrous filler to the plate-like filler is preferably not less than 3 and not more than 10, more preferably not less than 4 and not more than 7. When the mass ratio falls within the above-mentioned range, particularly excellent crack resistance and a good flow balance are exhibited as compared to a case where one of the plate-like filler and the fibrous filler is used alone when a molded article having a thin section and having a welded section is to be obtained.

Further, in the liquid crystal polyester composition, the flow starting temperature is not lower than 250° C. and lower than 314° C. The flow starting temperature of the liquid crystal polyester composition is preferably not lower than 260° C. and not higher than 310° C., more preferably not lower than 280° C. and not higher than 310° C. When the flow starting temperature is lower than 250° C., damage may occur as a high-temperature heat such as a reflow step cannot be endured when an electronic device is produced using a molded article formed of the liquid crystal polyester composition. When the flow starting temperature is higher than 314° C., the crack resistance of a molded article formed of the liquid crystal polyester composition is reduced.

The flow starting temperature of the liquid crystal polyester composition can be adjusted by controlling the content of the fibrous filler and the plate-like filler and the flow starting temperature of the liquid crystal polyester.

Among them, the flow starting temperature of the liquid crystal polyester composition strongly depends on the flow starting temperature of a resin component as a base. Therefore, by selecting a liquid crystal polyester having an appropriate flow starting temperature according to a content of the fibrous filler and the plate-like filler, a liquid crystal polyester composition showing an intended flow starting temperature can be obtained.

That is, when the amount of the fillers (fibrous filler and plate-like filler) added to the liquid crystal polyester is changed to an amount in a range of not less than 65 parts by mass and not more than 100 parts by mass in total, the flow starting temperature of the liquid crystal polyester composition usually varies within a range of −15° C. to +15° C. Therefore, for ensuring that the flow starting temperature of the liquid crystal polyester is not lower than 250° C. and lower than 314° C., a liquid crystal polyester having a flow starting temperature of not lower than 235° C. and lower than 329° C. can be used. The flow starting temperature is preferably not lower than 265° C. and lower than 299° C.

The liquid crystal polyester may be one liquid crystal polyester, or may be a mixture of two or more liquid crystal polyesters having different flow starting temperatures. When the liquid crystal polyester is a mixture of two or more liquid crystal polyesters, the liquid crystal polyester composition can be made to have a flow starting temperature of not lower than 250° C. and lower than 314° C. by controlling the flow starting temperature of the mixture of liquid crystal polyesters.

The flow starting temperature of a mixture of liquid crystal polyesters can be estimated as a weighted average value of flow starting temperatures of liquid crystal polyesters which corresponds to a blending ratio of liquid crystal polyesters contained in the mixture. Therefore, by mixing a liquid crystal polyester having a higher flow starting temperature and a liquid crystal polyester having a lower flow staring temperature as compared to a target flow starting temperature, a mixture of liquid crystal polyesters having a desired flow starting temperature can be prepared.

In the liquid crystal polyester composition of this embodiment, it is preferred that a liquid crystal polyester used comprises a liquid crystal polyester (A) and a liquid crystal polyester (B), wherein the liquid crystal polyester (A) comprises a repeating unit represented by the formula (1), a repeating unit represented by the formula (2) and a repeating unit represented by the formula (3), with $Ar^1$ in the formula (1) being a p-phenylene group, and the liquid crystal polyester (B) comprises a repeating unit represented by the formula (1), a repeating unit represented by the formula (2) and a repeating unit represented by the formula (3), with $Ar^1$ in the formula (1) being a 2,6-naphthylene group.

Such liquid crystal polyester composition which comprises the liquid crystal polyester (A) and the liquid crystal polyester (B) can form a molded article in which cracks are further hardly generated.

When the liquid crystal polyester comprises the liquid crystal polyester (A) and the liquid crystal polyester (B), it is preferred that the liquid crystal polyester comprises the liquid crystal polyester (A) in an amount of 20 parts by mass or more based on 100 parts by mass of the liquid crystal polyester. The liquid crystal polyester contains the liquid crystal polyester (A) in an amount of more preferably not less than 20 parts by mass and less than 100 parts by mass, further preferably not less than 45 parts by mass and not more than 95 parts by mass, still further preferably not less than 70 parts by mass and not more than 95 parts by mass.

(Other Components)

The liquid crystal polyester composition of this embodiment may comprise additives and/or resin components other than the liquid crystal polyester as long as the effect of the present invention is not impaired. Examples of additives that may be contained in the liquid crystal polyester composition may include an antioxidant, a heat stabilizer, an ultraviolet absorber, an antistatic agent, a surfactant, a flame retardant and a colorant. The blending ratio of these additives is not less than 0 part by mass and not more than 5 parts by mass based on 100 parts by mass of the liquid crystal polyester.

Examples of resin components other than the liquid crystal polyester which the liquid crystal polyester composition may comprise include thermoplastic resins such as polypropylene, polyamide, polyesters other than liquid crystal polyesters, polysulfone, polyphenylene sulfide, polyether ketone, polycarbonate, polyphenylene ether and polyether imide; and thermosetting resins such as phenol resins, epoxy resins, polyimide resins and cyanate resins. The blending ratio of these resin components is not less than 0 part by mass and not more than 20 parts by mass based on 100 parts by mass of the liquid crystal polyester.

(Method for Producing Liquid Crystal Polyester Composition)

A method for producing a liquid crystal polyester composition according to this embodiment includes a step of melting and kneading the liquid crystal polyester in an amount of 100 parts by mass as well as a mixture which contains a fibrous filler raw material and the plate-like filler in an amount of not less than 65 parts by mass and not more than 100 parts by mass in total.

The filler raw material used in the method for producing a liquid crystal polyester composition according to this embodiment has a number average fiber diameter of not less than 5 μm and not more than 15 μm and a number average aspect ratio of 100 or more. Preferably, the filler raw material has a number average fiber diameter of not less than 5 μm and not more than 15 μm and a number average fiber length of not less than 1 mm and not more than 3 mm. As the filler raw material, one formed of a forming material similar to that of the fibrous filler can be used.

An extruder used in the melting and kneading step has a cylinder and a screw installed in the cylinder. The cylinder has a first supply port, and a second supply port set on the downstream side in the extrusion direction with respect to the first supply port. The cylinder is preferably one having one or more vent section.

The screw has a ratio (L/D) of not less than 15 and not more than 65 where L is an effective length of the screw and D is a diameter of the screw.

The "diameter of a screw" is a "nominal outer diameter size of a screw", i.e. a basic size of the outer diameter of a screw at the leading end of the screw. The "effective length of a screw" is "a length of a slot of a screw in the axis direction", i.e. a length in the axis direction of a section provided with a slot in a screw.

In the method for producing a liquid crystal polyester composition according to this embodiment, the liquid crystal polyester in an amount of 50% by mass or more based on the total supply amount and the filler raw material in an amount of 50% by mass or less based on the total supply amount are supplied from the first supply port, and the residual amount of the liquid crystal polyester, the residual amount of the filler raw material and the total amount of the plate-like filler are supplied from the second supply port to be melted and kneaded.

Hereinafter, the method for producing a liquid crystal polyester composition will be described in detail with reference to the drawing. FIG. 1 is a schematic sectional view illustrating an extruder that is used in the method for producing a liquid crystal polyester composition.

The extruder 10 shown in FIG. 1 has a motor 1 stored in a motor box 1a, a cylinder 2 provided adjacent to the motor box 1a, and a screw 3 inserted in the cylinder 2 and connected to the motor 1. The extruder 10 is a twin screw extruder with two screws 3 disposed in the cylinder 2.

The cylinder 2 is provided therein with a main feed port (first supply port) 5 for supplying a part of a liquid crystal polyester, a filler raw material, a plate-like filler and other components used as necessary (hereinafter, may be referred to collectively as "raw material components"); a side feed port (second supply port) 7 set on the downstream side in the extrusion direction (in the rear) with respect to the main feed port 5 and intended for supplying a residual part of the raw material components into the cylinder 2; a first vent section 4 and a second vent section 6 for discharging a volatile component (gas) generated in the cylinder 2; and a discharge die 9 for molding a kneaded product obtained by melting and kneading.

In the cylinder 2, the main feed port 5 is provided at the position of the uppermost stream in the extrusion direction (position on the motor box 1 side), the side feed port 7, the first vent section 4 and the second vent section 6 are provided in this order from the main feed port 5 toward the downstream side in the extrusion direction (rearward in the extrusion direction, i.e. to the discharge die 9 side), and the discharge die 9 having a nozzle hole 9a communicating with the cylinder 2 is provided at the end of the cylinder 2 on the downstream side in the extrusion direction. It is preferred that in the cylinder 2, the cylinder temperature is sufficiently controlled for suppressing shear heating.

The main feed port 5 and the side feed port 7 each has a hopper connected to the inside of the cylinder 2 and a supply device that supplies raw material components at a constant mass rate or constant volume rate. Examples of the supply system of the supply device include a belt system, a screw system, a vibration system and a table system.

The first vent section 4 and the second vent section 6 may be an open vent system opened to the air, or may be a vacuum vent system connected to a water seal type pump, a rotary pump, an oil diffusion pump, a turbo pump or the like to be held in vacuum.

The screw 3 has a ratio L/D of not less than 15 and not more than 65, and is provided with a conveyance section 8 for conveying raw material components or a kneaded product. In the screw 3, a first kneading section 11 is provided between the main feed port 5 and the side feed port 7, a second kneading section 12 is provided between the side feed port 7 and the first vent section 4, and a third kneading section 13 is provided between the first vent section 4 and the second vent section 6. The first to third kneading sections 11 to 13 are each provided for plasticizing and kneading raw material components or a kneaded product. The screw 3 may be further provided with other kneading sections.

The screw 3 is constructed by combining screw elements. Generally, the conveyance section 8 is constructed by combining forward flight (full flight) screw elements, and the first kneading section 11, the second kneading section 12 and the third kneading section 13 are constructed by combining full flight, reverse flight, seal ring, forward kneading disc, neutral kneading disc and reverse kneading disc screw elements etc.

For each of the first kneading section 11, the second kneading section 12 and the third kneading section 13, it is preferred to use an element having a configuration in which kneading discs are superimposed on one another while being shifted at a phase angle of more than 0 degree and less than 90 degrees, and a neutral kneading element (configuration in which kneading discs are superimposed on one another while being shifted at a phase angle of 90 degrees).

As other elements that form the screw 3, any screw element may be used as long as overall conveyance characteristics of a molten kneaded product are not deteriorated.

The extruder that is used in this embodiment is not limited to the twin screw extruder shown in FIG. 1, and may be a single screw extruder. Examples of the twin screw extruder include same-direction-rotation type one- to three-thread screw extruders, and different-direction-rotation type parallel shaft type, inclined shaft type and incomplete engagement type extruders, and same-direction-rotation type twin screw extruders are preferred.

The extruders described above are only a part of those that can be used in this embodiment, and other various known extruders can be used.

In the method for producing a liquid crystal polyester according to this embodiment, using an extruder as described above, the liquid crystal polyester in an amount of 50% by mass or more based on the total supply amount and the filler raw material in an amount of 50% by mass or less based on the total supply amount are supplied from the main feed port 5, and the residual amount of the liquid crystal polyester, the residual amount of the filler raw material and the total amount of the plate-like filler are supplied from the side feed port 7 to be melted and kneaded. The following effect is hereby obtained.

Usually, in melting and kneading using an extruder, a filler raw material tends to be ruptured in the extruder, leading to a reduction in number average fiber length. Therefore, in usual melting and kneading, a fibrous filler is supplied from the downstream side (second supply port) of the extruder, so that the time during which the filler is kneaded in the extruder is shortened to reduce a variation in number average fiber length of the fibrous filler.

In contrast, in the method for producing a liquid crystal polyester composition according to this embodiment, a part of the filler raw material is supplied from the first supply port together with the liquid crystal polyester, so that the time during which the filler raw material is kneaded in the extruder is positively increased. Hereby, the filler raw material can be ruptured during extrusion processing to form a fibrous filler having a number average fiber length of more than 200 µm and less than 400 µm.

The fibrous filler having a number average fiber length of more than 200 µm and less than 400 µm is so small fiber that it is difficult to handle. However, in the production method of this embodiment, the number average fiber length of the fibrous filler can be controlled during melting and kneading, and therefore a blending operation using so small fibrous filler is unnecessary, that a desired liquid crystal polyester composition can be easily produced.

Processing conditions are required to be changed according to a type and blending etc. of a filler raw material used, but can be appropriately set by confirming a relationship between processing conditions and the number average fiber length of a fibrous filler contained in the obtained liquid crystal polyester by a preliminary experiment.

For example, when the number average fiber length of the fibrous filler is reduced with respect to a fibrous filler obtained under certain conditions (referred to as "reference conditions" in descriptions below), the ratio of the filler raw material supplied from the first supply port may be increased as compared to reference conditions. The number average fiber length of the fibrous filler can also be reduced by using a screw having a larger L/D ratio as compared to reference conditions. Further, the number average fiber length of the fibrous filler can also be reduced by decreasing the cylinder temperature as compared to reference conditions to increase the shear force by a screw. The number average fiber length of the fibrous filler can be reduced by decreasing the discharge amount per unit time to increase the kneading time.

The number average fiber diameter of the filler raw material and the volume average particle size of the plate-like filler are not substantially changed by melting and kneading. Accordingly, the number average fiber diameter of the filler raw material and the volume average particle size of the plate-like filler are substantially the same as the number average fiber diameter of the fibrous filler and the volume average particle size of the plate-like filler contained in the obtained liquid crystal polyester composition.

(Molded Article)

A molded article of this embodiment is obtained by injection-molding the liquid crystal polyester composition or a liquid crystal polyester composition produced by the method for producing a liquid crystal polyester composition.

Injection molding can be performed, using an injection molding machine (e.g. "Electric Horizontal Molding Machine Model ES400" manufactured by NISSEI PLASTIC INDUSTRIAL CO., LTD.): by melting the liquid crystal polyester composition, heating the molten liquid crystal polyester composition to an appropriate temperature, and injecting into a mold having a desired cavity shape.

Examples of the molded article may include bobbins such as light pickup bobbins and transformer bobbins; relay components such as relay cases, relay bases, relay spools and relay armatures; connectors such as RIM, DDR, I/O, DIMM and Board to Board connectors, FPC connectors, card connectors and CPU sockets; reflectors such as lamp reflectors and LED reflectors; holders such as lamp holders and heater holders; vibration plates such as speaker vibration plates; separation claws such as separation claws for copiers and separation claws for printers; camera module components; switch components; motor components; sensor components; hard disk drive components; tableware such as ovenware; vehicle components; aircraft components; and sealing members such as sealing members for semiconductor elements and sealing members for coils.

Particularly, the liquid crystal polyester composition of this embodiment gives a molded article having excellent crack resistance and having reduced flash and short shots even when molded into a molded article having a thin section or a molded article having a complicated shape, and is therefore suitably used as a material of a connector such as a CPU socket. In a connector molded using the liquid crystal polyester composition, generation of cracks can be suppressed even when heat is applied in, for example, a reflow step.

The liquid crystal polyester composition having the above-mentioned configuration can give an excellent molded article by securing both crack resistance of a molded article molded and exhibition of a good flow balance during melt processing.

According to the above-mentioned method for producing a liquid crystal polyester composition, the number average fiber length of the fibrous filler can be controlled during processing, so that the above-mentioned liquid crystal composition can be easily produced.

Further, the above-mentioned molded article has excellent crack resistance and has reduced flash and short shots.

EXAMPLES

Hereinafter, the present invention will be described by way of examples, but the present invention is not limited to these examples. In the examples, measurements were performed by the following methods.
(Measurement of Flow Starting Temperature of Liquid Crystal Polyester and Liquid Crystal Polyester Composition)

Using a flow tester ("Model CPT-500" manufactured by Shimadzu Corporation), a flow starting temperature of a liquid crystal polyester was determined by charging about 2 g of a liquid crystal polyester into a cylinder provided with a die including a nozzle having an inner diameter of 1 mm and a length of 10 mm, melting the liquid crystal polyester with increasing the temperature at a rate of 4° C./minute under a load of 9.8 MPa (100 kgf/cm$^2$), and extruding from the nozzle, and measuring a temperature when a viscosity was 4800 Pa·s (48000 poises).

A flow starting temperature of a liquid crystal polyester composition was determined in the same manner as described above except that the liquid crystal polyester in the above-described operation was changed to a liquid crystal polyester composition.
(Measurement of Number Average Fiber Length and Number Average Fiber Diameter of Fibrous Filler)

In a crucible, 1.0 g of a liquid crystal composition was taken, and treated in an electric furnace at 600° C. for 4 hours and thereby incinerated to obtain a residue containing a fibrous filler. The residue was dispersed in methanol, and spread over a slide glass, and in this state, a microscope photograph was taken. Next, in a projection image of the fibrous filler from a field view direction, which was obtained from the microscope photograph, a length in a longitudinal direction was read as a fiber length, a length in a direction orthogonal to the longitudinal direction was read as a fiber diameter, and a mean value was calculated to determine a number average fiber diameter and a number average fiber length. For calculation of the mean value, the population parameter was set to 400.
(Measurement of Volume Average Particle Diameter of Plate-Like Filler in Liquid Crystal Polyester Composition)

In a crucible, 1.0 g of a liquid crystal composition was taken, and treated in an electric furnace at 600° C. for 4 hours and thereby incinerated to obtain a residue containing a plate-like filler. The residue was dispersed in methanol, and spread over a slide glass, and in this state, a microscope photograph was taken. Next, an area was determined for a projection image of the plate-like filler from a field view direction, which was obtained from the microscope photograph, and when a circle having an area equal to the projection image was assumed, a diameter of the circle (area circle equivalent diameter) was read as a particle size of the plate-like filler, and an arithmetic mean value was calculated to determine a volume average particle size. For calculation of the mean value, the population parameter was set to 400.
(Measurement of Clacks of Molded Article)

Clacks of a molded article were measured according to the following method.

First, five injection-molded articles later described (1021 pin-compatible mode CPU sockets) were provided, and heated at 260° C. for 4 minutes and 40 seconds using an oven (DN 63H manufactured by YAMATO SCIENTIFIC CO., LTD.) to apply heat histories in the five molded articles. This temperature condition is a temperature condition that assumes a reflow step in production of an electronic device using a CPU socket.

The molded articles were allowed to cool to room temperature, the five molded article samples after heating were then observed with a zoom type stereoscopic microscope of 15 magnifications (ZMM-45T2 manufactured by SIGMA KOKI Co., LTD.), the number of cracks generated on the wall surface of the CPU socket was measured, and a summed value thereof was defined as the number of cracks.

In the examples, the molded article was rated good when the ratio of the number of cracks in 1021 holes of the CPU socket was less than 1%. That is, the number of cracks that is acceptable per one CPU socket is about 10, and the molded article can be rated good when the total number of cracks generated in five CPU sockets is no more than 50.
(Evaluation of Flash and Short Shots of Molded Article)

Flash and short shots in the molded article were evaluated by observing the surface of the injection-molded article described later (1021 pin-compatible mode CPU socket) with a zoom type stereoscopic microscope of 10 magnifications (ZMM-45T2 manufactured by SIGMA KOKI Co., LTD.).

For evaluation of flash, all the holes of the CPU socket filled with the resin were observed with a microscope, and when there were no holes in which flash occurred over the range of about up to 20% of the opening area of the holes, the molded article was rated "○", and when there was at least one of such holes, the molded article was rated "x".

For evaluation of short shots, the final filling position of the molten resin in the CPU socket was confirmed beforehand, the final filling position in the CPU socket molded with each resin composition was observed with a microscope. When the CPU socket was fully filled with the resin, the molded article was rated "○". When the CPU socket was recessed due to insufficient filling, the molded article was rated "x" irrespective of a recessed amount.

Reference Example 1

Production of Liquid Crystal Polyester (1)

Into a reaction vessel equipped with a stirrer, a torque meter, a nitrogen gas introduction pipe, a thermometer and a reflux condenser, charged were 994.5 g (7.2 mol) of p-hydroxybenzoic acid, 239.2 g (1.44 mol) of terephthalic acid, 159.5 g (0.96 mol) of isophthalic acid, 446.9 g (2.4 mol) of 4,4'-dihydroxybiphenyl and 1347.6 g (13.2 mol) of acetic anhydride. Then a gas in the reaction vessel was replaced with a nitrogen gas, 0.18 g of 1-methylimidazole was then added, and the mixture was heated from room temperature to 150° C. for 30 minutes under a nitrogen gas stream with stirring, and refluxed at 150° C. for 30 minutes.

Then, 2.4 g of 1-methylimidazole was added, the mixture was heated from 150° C. to 320° C. over 2 hours and 50 minutes while byproduct acetic acid and unreacted acetic anhydride were distilled away, and at the time when an increase in torque was observed, contents were taken out from the reaction vessel, and cooled to room temperature.

The obtained solid was crushed by a crusher, and the crushed product was heated under a nitrogen gas atmosphere from room temperature to 220° C. over 1 hour, heated from 220° C. to 240° C. over 30 minutes, and held at 240° C. for 10 hours to be solid phase-polymerized, and then cooled to obtain a powdered liquid crystal polyester (1). The flow starting temperature of the liquid crystal polyester (1) was 286° C.

Reference Example 2

Production of Liquid Crystal Polyester (2)

A powdered liquid crystal polyester (2) was obtained in the same manner as in Reference Example 1 except that the amount of terephthalic acid used was 299.0 g (1.8 mol), the amount of isophthalic acid used was 99.7 g (0.6 mol), and as conditions for solid phase polymerization after crushing, the crushed product was heated under a nitrogen gas atmosphere from room temperature to 250° C. over 1 hour, heated from 250° C. to 295° C. over 5 hours, and held at 295° C. for 3 hours. The flow starting temperature of the liquid crystal polyester (2) was 327° C.

Reference Example 3

Production of Liquid Crystal Polyester (3)

Into a reaction vessel as the same as that in Reference Example 1, charded were 1034.99 g (5.5 mol) of 2-hydroxy-6-naphthoic acid, 272.52 g (2.475 mol) of hydroquinone, 378.33 g (1.75 mol) of 2,6-naphthalenedicarboxylic acid, 83.07 g (0.5 mol) of terephthalic acid and 1226.87 g (11.9 mol) of acetic anhydride, a gas in the reaction vessel was replaced with a nitrogen gas, 0.17 g of 1-methylimidazole was then added, and the mixture was heated under a nitrogen gas stream with stirring. At the time when the internal temperature reached 145° C., the mixture was stirred for 1 hour while being kept at this temperature.

Next, the mixture was heated from 145° C. to 310° C. over 3 hours and 30 minutes while distilled byproduct acetic acid and unreacted acetic anhydride were distilled away. The mixture was kept at this temperature for 3 hours to obtain a liquid crystal polyester. The obtained liquid crystal polyester was cooled to room temperature, and crushed by a crusher to obtain a liquid crystal polyester powder (prepolymer) having a particle size of about 0.1 to 1 mm. The obtained powder was heated from 25° C. to 250° C. over 1 hour, then heated from this temperature to 310° C. over 10 hours, and then kept at this temperature for 5 hours to be solid phase-polymerized.

Thereafter, the solid phase-polymerized powder was cooled to obtain a liquid crystal polyester (3) in powder form. The flow starting temperature of the liquid crystal polyester (3) was 333° C.

Examples 1 to 13 and Comparative Examples 1 to 6

The liquid crystal polyesters (1), (2) and (3), chopped glass fibers (manufactured by ASAHI FIBER GLASS Co., Ltd.; CS03JAPX-1; number average fiber diameter: 10 μm; number average fiber length: 3 mm; number average aspect ratio: 300) and talc (manufactured by Nippon Talc Co., Ltd.; MS-KY; volume average particle size: 14.2 μm) were melted and kneaded at 340° C. at the ratio shown in the tables in FIGS. 2 and 3 to be pelletized using a twin screw extruder (manufactured by Ikegai Corp.; PCM-30HS, screw rotation: same direction, L/D=44).

The volume average particle size of the talc before pelletization is a value measured using a laser diffraction method.

In Examples 1 to 13 and Comparative Examples 1 to 3, 5 and 6, the liquid crystal polyester in an amount of 55% by mass based on the total supply amount and the chopped glass fibers in an amount of 15% by mass based on the total supply amount were supplied from a supply port on the upstream side of the extruder, and the liquid crystal polyester in an amount of 45% by mass based on the total supply amount, the chopped glass fibers in an amount of 85% by mass based on the total supply amount and the talc in the total supply amount were supplied from a supply port on the downstream side of the extruder.

In Comparative Example 4, the liquid crystal polyester in the total supply amount is supplied from the supply port on the upstream side of the extruder, and the chopped glass fibers in the total supply amount and the talc in the total supply amount were supplied from the supply port on the downstream side of the extruder.

A 1021 pin-compatible model CPU socket molded article was obtained by injection-molding the obtained pellet under molding conditions of a cylinder temperature of 340° C. and a mold temperature of 65° C. using an injection molding machine (ES400 manufactured by NISSEI PLASTIC INDUSTRIAL CO., LTD.).

In the model CPU socket of Example 1, a volume average particle size of the contained talc (plate-like filler) was measured and resultantly confirmed to fall within a range of not less than 10 μm and not more than 30 μm, with the volume average particle size being 14.6 μm.

For the obtained CPU socket, cracks, flash and short shots were evaluated by the above-described methods. Evaluation results are shown in Tables 1 and 2.

TABLE 1

|  |  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Liquid crystal polyester 1 | parts by mass | 100 | 100 | 100 | 90 | 70 | 45 | 45 | 45 | 45 | 30 | 20 | 95 | 90 |

TABLE 1-continued

|  |  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Liquid crystal polyester 2 | parts by mass |  | — |  | 10 | 30 | 55 | 55 | 55 | 55 | 70 | 80 |  | — |
| Liquid crystal polyester 3 | parts by mass |  |  |  |  |  |  |  |  |  |  |  | 5 | 10 |
| Glass fibers | parts by mass | 65 | 75 | 80 | 65 | 65 | 51 | 60 | 65 | 83 | 65 | 65 | 65 | 65 |
| Talc | parts by mass | 11 | 13 | 20 | 11 | 11 | 17 | 7 | 11 | 6 | 11 | 11 | 11 | 11 |
| Flow starting temperature | ° C. | 288 | 289 | 288 | 291 | 295 | 304 | 304 | 305 | 305 | 309 | 312 | 288 | 288 |
| Glass fibers/talc | mass ratio | 5.9 | 5.8 | 4.0 | 5.9 | 5.9 | 3.0 | 8.6 | 5.9 | 13.8 | 5.9 | 5.9 | 6.2 | 6.0 |
| Glass fiber length |  | 224 | 253 | 263 | 237 | 229 | 278 | 202 | 203 | 244 | 278 | 279 | 239 | 243 |
| Clacks (n = 5 in total) | number of spots | 2 | 24 | 20 | 3 | 31 | 39 | 34 | 27 | 21 | 28 | 34 | 0 | 0 |
| Flash |  | ○ | ○ | ○ | ○ | ○ | ○ | ○ | ○ | ○ | ○ | ○ | ○ | ○ |
| Short shots |  | ○ | ○ | ○ | ○ | ○ | ○ | ○ | ○ | ○ | ○ | ○ | ○ | ○ |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Liquid crystal polyester 1 | parts by mass |  | — |  | 100 | 100 | 45 |
| Liquid crystal polyester 2 | parts by mass | 100 | 100 | 100 | — |  | 55 |
| Liquid crystal polyester 3 | parts by mass |  |  | — |  |  |  |
| Glass fibers | parts by mass | 60 | 51 | 71 | 75 | 75 | 60 |
| Talc | parts by mass | 7 | 17 | 11 | 13 | 13 | 28 |
| Flow starting temperature | ° C. | 315 | 314 | 314 | 290 | 288 | 304 |
| Glass fibers/talc | mass ratio | 8.6 | 3.0 | 6.5 | 5.8 | 5.8 | 2.1 |
| Glass fiber length |  | 223 | 212 | 215 | 428 | 120 | 244 |
| Clacks (n = 5 in total) | number of spots | 143 | 157 | 104 | — | 63 | — |
| Flash |  | ○ | ○ | ○ | ○ | ○ | × |
| Short shots |  | ○ | ○ | ○ | × | ○ | × |

From the results shown in the table, the CPU sockets obtained in Examples 1 to 13 were good molded articles having less cracks and having reduced occurrence of flash and short shots. The CPU sockets obtained in Examples 12 and 13 were molded articles having excellent heat resistance with no cracks generated therein.

On the other hand, the CPU sockets obtained in Comparative Examples 1 to 3 and 5 had poor crack resistance with a large number of cracks generated therein. For Comparative Examples 4 and 6, flash and short shots occurred, and a molded article worthy of performing crack evaluation was not obtained.

From these results, the liquid crystal polyester composition of the present invention was confirmed to give an excellent molded article by securing both crack resistance and exhibition of a good flow balance, and it was apparent that the molded article obtained has an excellent physical property balance. Further, it was apparent that the liquid crystal polyester composition can be easily produced by the method for producing a liquid crystal polyester composition according to the present invention.

INDUSTRIAL APPLICABILITY

According to the present invention, there can be provided a liquid crystal polyester composition that gives an excellent molded article by securing both crack resistance and a good flow balance. Further, there can be provided a method for producing the above-mentioned liquid crystal polyester composition, and a molded article molded using the liquid crystal polyester composition.

The invention claimed is:

1. A liquid crystal polyester composition comprising: a liquid crystal polyester in an amount of 100 parts by mass as well as a fibrous filler and a plate filler in a total filler amount of not less than 65 parts by mass and not more than 100 parts by mass, said fibrous filler having a number average fiber diameter of not less than 5 µm and not more than 15 µm, and a number average fiber length of more than 200 µm and less than 400 µm, the mass ratio of the fibrous filler to the plate filler being not less than 3 and not more than 15, and wherein the composition has a flow starting temperature of not lower than 250° C. and lower than 314° C.

2. The liquid crystal polyester composition according to claim 1 wherein the liquid crystal polyester has a repeating unit represented by the following formula (1), a repeating unit represented by the following formula (2) and a repeating unit represented by the following formula (3):

  (1)

  (2)

  (3)

where $Ar^1$ represents a phenylene group, a naphthylene group or a biphenylene group, $Ar^2$ and $Ar^3$ each independently represent a phenylene group, a naphthylene group, a biphenylene group or a group represented by the following formula (4), X and Y each independently represent an oxygen atom or an imino group, the hydrogen atoms present in the group represented by $Ar^1$, $Ar^2$ or $Ar^3$ may each independently be replaced by a halogen atom, an alkyl group or an aryl group;

  (4)

where $Ar^4$ and $Ar^5$ each independently a phenylene group or a naphthylene group, and Z represents an oxygen atom, a sulfur atom, a carbonyl group, a sulfonyl group or an alkylidene group.

3. The liquid crystal polyester composition according to claim 2 wherein the liquid crystal polyester is a mixture of a liquid crystal polyester (A) comprising the repeating unit represented by the formula (1), the repeating unit represented by the formula (2) and the repeating unit represented by the formula (3), where $Ar^1$ is a p-phenylene group, and a liquid crystal polyester (B) including the repeating unit represented by the formula (1), the repeating unit represented by the formula (2) and the repeating unit represented by the formula (3), wherein $Ar^1$ is a 2,6-naphthylene group.

4. The liquid crystal polyester composition according to claim 3 which comprises the liquid crystal polyester (A) in an amount of 20 parts by mass or more based on 100 parts by mass of the liquid crystal polyester.

5. The liquid crystal polyester composition according to claim 1 wherein the fibrous filler is at least one selected from the group consisting of a glass fiber, a wollastonite whisker, an aluminum borate whisker and a potassium titanate whisker.

6. The liquid crystal polyester composition according to claim 1 wherein the plate filler is one or both of mica and talc.

7. The liquid crystal polyester composition according to claim 1 wherein the plate filler has a volume average particle size of not less than 10 µm and not more than 30 µm.

8. A method for producing a liquid crystal polyester composition, including a step of melting and kneading a liquid crystal polyester in an amount of 100 parts by mass as well as a mixture which contains a fibrous filler raw material and a plate filler in an amount of not less than 65 parts by mass and not more than 100 parts by mass in total, wherein the fibrous filler raw material has a number average fiber diameter of not less than 5 µm and not more than 15 µm and a number average aspect ratio of 100 or more, an extruder used in the melting and kneading step has a cylinder and a screw installed in the cylinder, the cylinder has a first supply port, and a second supply port set on the downstream side in the extrusion direction with respect to the first supply port, the screw has a ratio (L/D) of not less than 15 and not more than 65 where L is an effective length of the screw and D is a diameter of the screw, and for melting and kneading, the liquid crystal polyester in an amount of 50% by mass or more based on the total supply amount and the filler raw material in an amount of 50% by mass or less based on the total supply amount are supplied from the first supply port, and the residual amount of the liquid crystal polyester, the residual amount of the filler raw material and the total amount of the plate filler are supplied from the second supply port.

9. A molded article comprising the liquid crystal polyester composition according to claim 1.

10. The molded article according to claim 9 which is a connector.

11. The molded article according to claim 10 wherein the connector is a CPU socket.

* * * * *